United States Patent [19]

Delmerico et al.

[11] Patent Number: 5,074,572

[45] Date of Patent: Dec. 24, 1991

[54] REFUSE CONTAINER DOLLY HAVING INTEGRAL ALIGNMENT MEANS

[75] Inventors: Paul E. Delmerico; Greg P. Terek, both of Winchester; Charles T. Ingles, Bentonville, all of Va.

[73] Assignee: Rubbermaid Commercial Products Inc., Winchester, Va.

[21] Appl. No.: 493,525

[22] Filed: Mar. 14, 1990

[51] Int. Cl.⁵ .............................................. B62B 11/00
[52] U.S. Cl. ............................... 280/47.34; 280/79.2; 280/79.5; 220/298; 220/909; 248/129
[58] Field of Search ............... 280/87.01, 87.21, 87.05, 280/47.34, 79.11, 79.2, 79.5; 220/298, 909, 908, 330, 331; D34/5, 23, 1; 248/129, 131

[56] References Cited

U.S. PATENT DOCUMENTS

| | | | |
|---|---|---|---|
| D. 251,833 | 5/1979 | Maza et al. | D34/23 |
| D. 256,902 | 9/1980 | Maza et al. | D34/23 |
| D. 257,721 | 12/1980 | Maza et al. | D34/23 |
| D. 257,767 | 1/1981 | Maza et al. | D34/23 |
| D. 257,823 | 1/1981 | Maza et al. | D34/23 |
| D. 260,229 | 8/1981 | Maza et al. | D34/1 |
| 926,288 | 6/1909 | Rice | 248/129 |
| 1,525,242 | 2/1925 | Jagschitz | 52/126.7 |
| 1,659,703 | 2/1928 | Ramsey | 215/330 |
| 2,626,078 | 1/1953 | Hutchisson, Jr. et al. | D34/7 X |
| 2,689,469 | 9/1954 | Happe et al. | 220/69 |
| 3,716,161 | 2/1973 | Julian et al. | 215/330 X |
| 3,904,218 | 9/1975 | Kostic | 280/79.2 |
| 4,167,271 | 9/1979 | Jorgensen | 280/79.5 |
| 4,222,580 | 9/1980 | Krokonko | 280/79.5 X |
| 4,273,248 | 6/1981 | Lehmann | 215/331 |
| 4,557,201 | 12/1985 | Webb, Jr. | 280/79.11 X |
| 4,691,833 | 9/1987 | Ahrens | 215/331 X |
| 4,832,220 | 5/1989 | Quennessen | 215/331 |

FOREIGN PATENT DOCUMENTS

| | | |
|---|---|---|
| 506025 | 9/1954 | Canada . |
| 2264595 | 5/1974 | Fed. Rep. of Germany . |
| 681259 | 1/1930 | France . |
| 154659 | 5/1956 | Sweden . |

OTHER PUBLICATIONS

Sell Sheet, White, 10770 N. 46th St., P.O. Box 16647, Tampa, FL 33687, Publication date Jun. 1, 1988.

Catalog Page, Continental Manufacturing Co., 123 Byassee Dr., St. Louis, MI, 63042, Publication date unknown.

P. 15, Rubbermaid Commercial Products, Inc., 3124 Valley Ave., Winchester, VA, 22601, Publication date 1988.

Primary Examiner—Andres Kashnikow
Assistant Examiner—Brian L. Johnson
Attorney, Agent, or Firm—Richard B. O'Planick

[57] ABSTRACT

A refuse container and dolly assembly in which the refuse container and dolly includes a square or rectangular transverse sectional configuration. An alignment flange is provided in the top surface of the dolly, adapted to engage a registration flange in the underside of the container, whereby, upon rotary connection between the dolly and an underside of the waste container, the side walls of the dolly and the waste container are brought into co-planar alignment.

6 Claims, 5 Drawing Sheets

REFUSE CONTAINER DOLLY HAVING INTEGRAL ALIGNMENT MEANS

FIELD OF THE INVENTION

The present invention relates to mobile refuse container assemblies in general, and in particular to assemblies comprising a dolly component which is connectable by screw thread attachment to a refuse container underside.

BACKGROUND OF THE INVENTION

Mobile refuse container assemblies are well known in sanitary maintenance applications. Typically such assemblies comprise a refuse container, round in transverse cross section, and a circular dolly which is attachable to the underside of the container by screw thread engagement. For example, Design U.S. Pat. No. 256,902 and Design U.S. Pat. No. 257,721 illustrate the dolly of the type conventionally used in a industry. Additionally, Design U.S. Pat. No. 260,229 illustrates a round refuse container which is adapted for screw thread attachment to the dolly.

While the above identified dolly and container combination works well and has been generally well accepted in the trade, certain shortcomings prevent the assembly from representing an ideal solution to the industries' needs. First, round refuse containers are not as volume efficient as square or rectangular cross-sectional refuse containers. Stated differently, a circular refuse container must have a diameter which is greater than the side of a square footprinted refuse container in order to contain the same volume of waste material. This volumetric inefficiency means that a round container takes up greater storage space than a square or rectangular container. Also, a round container cannot be stored flat against a wall, making it less than suitable for situations where storage space is limited.

Adaptation of conventional circular refuse containers to a square configuration however is not straight forward, since the refuse container must be connectable to a dolly component in order to be mobile. Most conveniently, moreover, the waste container should be connectable to a dolly by screw thread attachment. In the prior art, a waste container is provided with a centrally disposed cylindrical socket extending into an underside surface, which receives a cylindrical boss centrally disposed in the top surface of the dolly. The container cylindrical socket is internally threaded to receive the externally threaded dolly boss. In a circular configuration, merely screwing the dolly component into the socket of the waste container results in a satisfactory combination. However, for a square or rectangular footprinted dolly and container, attaching the dolly to the container by rotationally screwing it into the socket can result in a misalignment between the dolly and the waste container side walls.

SUMMARY OF THE PRESENT INVENTION

The present invention overcomes the above problems of misalignment between a square, or rectangular, refuse container and dolly. The container and dolly are attached by conventional fashion; that is, by the engagement of a cylindrical, upwardly extending, dolly boss into a cylindrical threaded socket in the underside of the container. The present invention provides alignment means disposed in a top surface of the dolly adapted to engage a registration flange in the underside of the container, whereby, upon rotary connection between the dolly and waste container, the side walls of the dolly and the waste container are brought into side wall coalignment. The alignment means in the dolly comprises a flange extending perpendicularly upward from the dolly top surface, having an inclined top surface, and a transverse groove extending downwardly into the inclined surface. An integral rib of the container rides over the inclined dolly flange surface as the dolly is screw fitted into the container socket. When the rib enters into the transverse flange groove, rotary movement between the dolly and the waste container is terminated. By select location of the dolly flange, and corresponding container rib, rotational movement between the dolly and the container is terminated where the side walls of the dolly and the container are in mutual co-alignment.

Accordingly, it is an objective of the present invention to provide a square refuse container and a corresponding square dolly component.

A further objective of the present invention is to provide a square waste container and dolly assembly having integral rotary connection means and registration means adapted to align the dolly and container in the assembled condition.

A further objective is to provide a square dolly and container assembly having integral registration and alignment means which can be readily overcome to facilitate disconnection of the dolly from the container.

Still a further objective of the present invention is provide a square container and dolly assembly having integrally formed means for conveniently aligning corresponding corners of the dolly and container in the assembled condition.

Yet a further objective of the present invention is to provide a square dolly and container assembly having alignment capability, yet requiring no additional hardware or componentry.

A further objective is to provide a square container and dolly assembly which is economically and readily manufactured, and readily utilized by the end user.

These and other objectives, which will be apparent to one skilled in the art, are achieved by a preferred embodiment which is described in detail below, and which is illustrated in the accompanying drawings.

BRIEF DESCRIPTION OF THE ACCOMPANYING DRAWINGS

DETAILED DESCRIPTION OF THE PREFERRED EMBODIMENT

Figure 1:
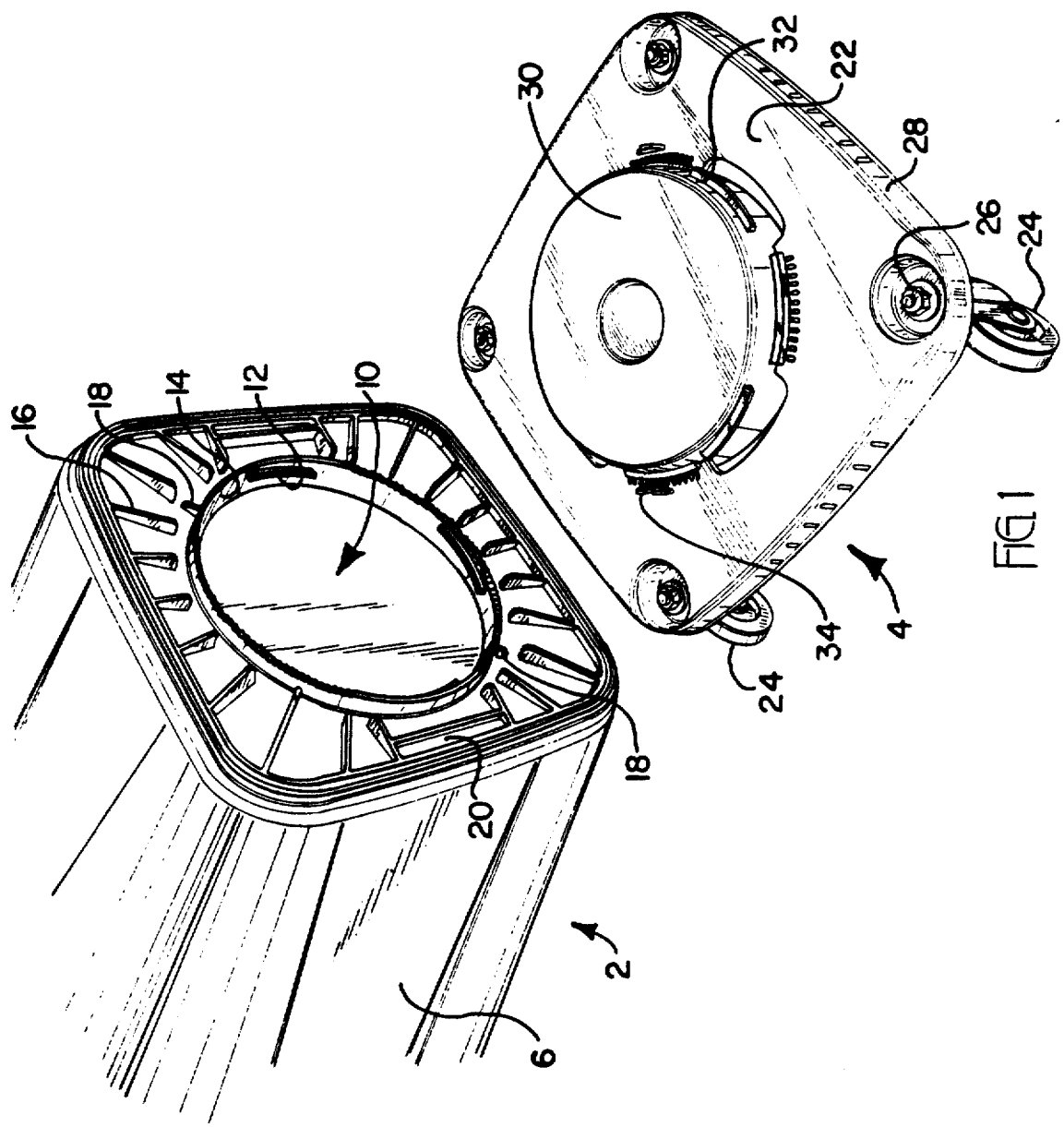
FIG. 1 is a exploded perspective view illustrating the underside of the square waste container and the top of the dolly to which the container is assembled.
Figure 2:
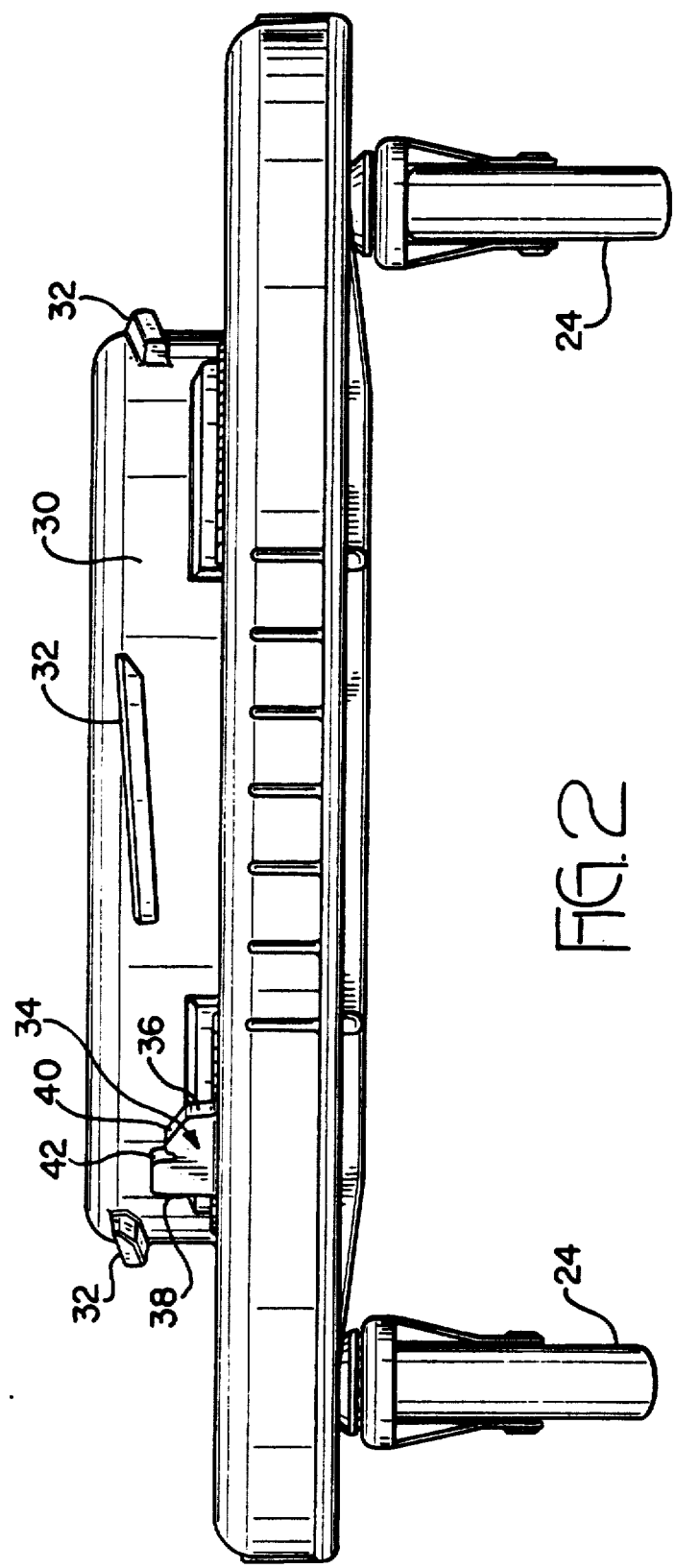
FIG. 2 is a front elevational view of the dolly.
Figure 3:
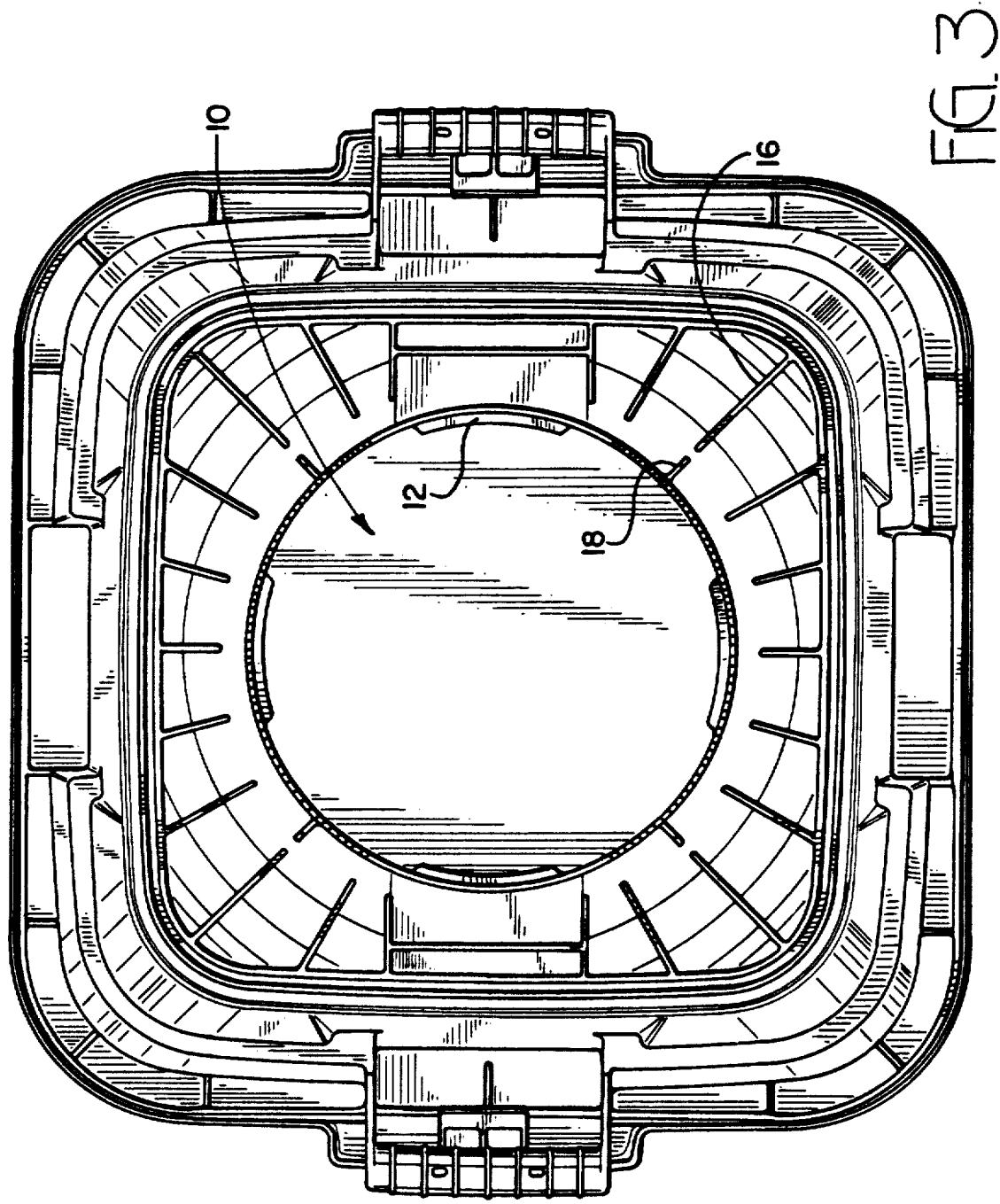
FIG. 3 is a bottom plan view of the container shown in FIG. 1.
Figure 4:
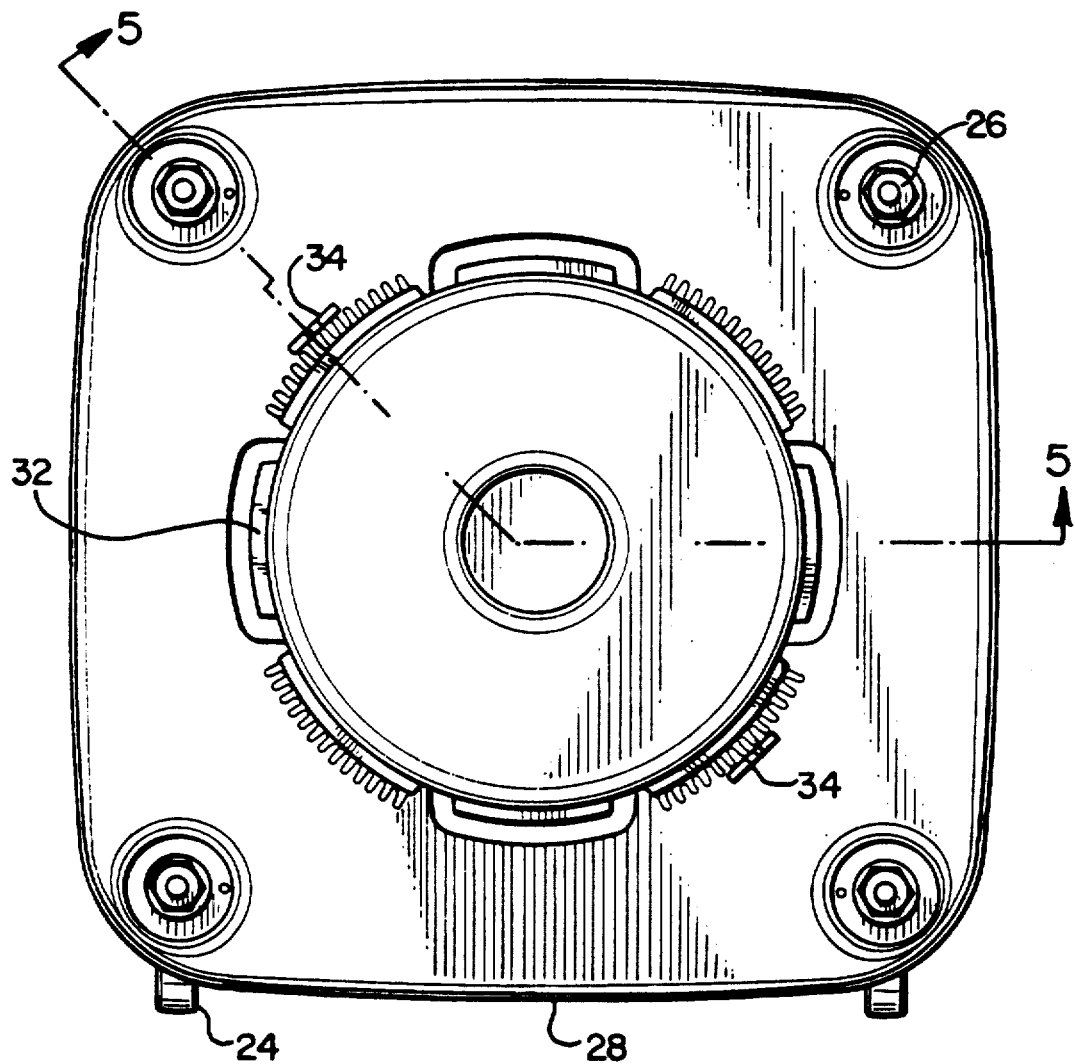
FIG. 4 is a top plan view of the dolly.

With initial reference to FIGS. 1 and 2, the subject waste container and dolly assembly is shown as comprising a container 2 having a square transverse sectional profile, and a dolly 4 which is likewise square in footprint. The container 2 comprises vertical side walls 6 and a bottom surface 8. A centrally disposed cylindrical socket 10 extends into the bottom surface 8 as shown in FIG. 1. The socket 10 is provided with internal screw threads 12 integrally formed from socket side walls 14. It will be noted that the socket side walls 14 have a top edge which is generally co-planar with the bottom surface 8 of container 2.

Continuing, radially extending structural ribs 16 extend outwardly from the side walls 14 of socket 10, toward the sides 6 of the container 2. A radially extending registration rib 18 is provided at each corner of the container 2, extending in the same direction as structural ribs 16.

Figure 5:
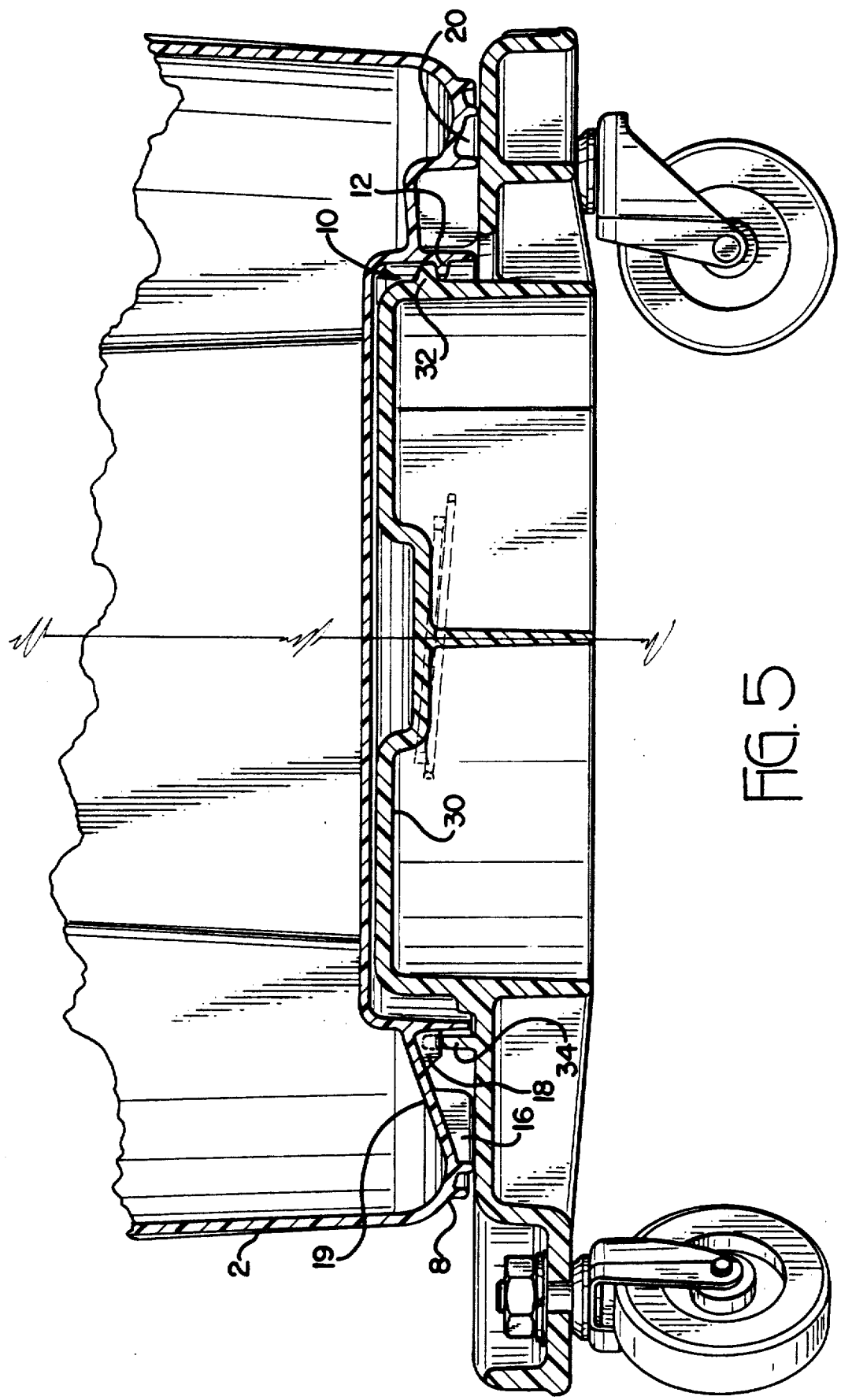
FIG. 5 is an assembled partial transverse sectional view through the container and dolly, taken along the line 5—5 of the dolly depicted in FIG. 4.

As best appreciated from FIG. 5, each structural rib 16 has a bottom surface which is co-planar with the bottom surface 8 of container 2. The bottom surface 8 tapers upwardly as shown at 19 in FIG. 5 toward the side walls 14 of socket 10. Consequently, ribs 16 are of increasing depth from the bottom edge of container surface 8 to side walls 14. The registration ribs 18 of the container 2 are located adjacent to the cylindrical side walls 14 of socket 10, with the height of each rib 18 being approximately one-third the maximum height of ribs 16. The reduced height of rib 18 creates a clearance between the bottom most edge of rib 18 and the bottom surfaces of ribs 16.

Reverting back to FIGS. 1 and 2, the bottom of container 2 is provided with a pair of opposing hand grip recesses 20 of rectangular configuration, identifying a hand hold by which the user can grasp the container from the bottom.

A dolly component 4, having a square footprint, is defined by a top surface 22 and is mobile by means of with casters 24 assembled to each corner. Each caster 24 is affixed through a corner at the dolly 4, and is retained there by a washer and nut combination 26, countersunk below the top surface 22. The sides 28 of dolly 4 are rounded at the corners as shown in FIG. 1.

Continuing, a cylindrical boss 30 extends upwardly from the top surface 22 of the dolly 4, and is provided with external screw threads 32. A pair of vertical flanges 34 are formed in top 22, generally adjacent to the cylindrical boss 30 and at opposite corners of the dolly 4. The vertical flanges 34, as shown in FIG. 2, are defined by a forward vertical wall 36, a rearward vertical wall 38, and an inclined top surface 40 which extends upwardly from the forward wall 36 to the rearward wall 38. The angle of inclination of top surface 40 is approximately 45 degrees. Situated two-thirds up the inclined top surface 40, and extending downwardly therein, is a transverse groove 42. The purpose of groove 42 will be explained below.

Assembly of the dolly to the container proceeds as follows. As will be appreciated from FIGS. 1 and 5, the dolly is attached by screw thread into the socket 10 of the container 2. The dolly cylindrical boss 30 is inserted into the socket 10, and rotational movement of the dolly relative to the container initiates the screw threaded attachment. As the dolly is rotated, the registration ribs 18 encounter the inclined surface 40 of the dolly vertical flange 34, and ride upward over said surface until entering into the transverse groove 42. At such a point, rotational movement between the dolly and the container is terminated, and the dolly is rigidly affixed to the underside of the container by screw threaded attachment.

It will be appreciated from FIG. 1 that by locating the vertical flange 34 of the dolly 4 at corner locations in the dolly top surface 22, and corresponding location of the registration ribs 18 of the container 2 at corners of the waste container underside surface, rotational movement between the dolly and the container will terminate when the side walls 28 of the dolly ar in co-planar and square alignment with the side walls 6 of the container. The direction of the incline of flange 40 coincides with the direction of rotation between the dolly and container. Registration between the ribs 18 and the vertical flanges 34 can be readily overcome by a reverse rotation of the dolly, whereby facilitating disconnection of the dolly from the container.

It will be appreciated that the dolly and the waste container can be molded of conventional plastics material, and that the vertical flanges 34 of the dolly and the registration ribs 18 of the container can be integrally molded therewith. Thus, co-alignment of the dolly and container is accomplished without the need for additional hardware. As will be appreciated, in the assembled condition, the dolly and container side walls are square, and the dolly lies entirely within the footprint of the container underside. The dolly and container assembly can therefore be stored against a wall, or in a corner.

While the aforementioned describes the preferred embodiment of the subject invention, the invention is not to be so restricted. Other embodiments, which will be apparent to one skilled in the art, and which utilizes the teachings hereinsetforth, are intended to be within the scope and spirit of the present invention.

We claim:

1. A mobile refuse container assembly of the type comprising a container having attachment means centrally disposed in an underside surface, and a dolly having centrally disposed connection means in the top surface for rotary engagement with said container attachment means, the improvement comprising:

said dolly having alignment means located adjacent to said connection means; and said container having registration means disposed in said underside surface adjacent to said attachment means, said registration means engaging said alignment means to terminate rotary movement between said container and said dolly when said container and dolly are in co-alignment;

said dolly alignment means comprising a flange extending perpendicularly upward from said dolly top surface, and having an inclined top surface and a transverse groove extending downwardly into said inclined surface; and said container registration means comprising a radially extending rib positioned to engage against said dolly flange surface and enter said groove as said container and said dolly are rotated into said co-alignment.

2. An assembly according to claim 1, wherein said dolly top surface and said container underside having complementary quadrilateral footprints, said dolly flange, and said container rib being located to engage when respective sides of said container and said dolly are co-planar.

3. An assembly according to claim 2 wherein said dolly connection means comprising an externally threaded cylindrical boss extending outward from said top surface, and said container attachment means comprising an internally threaded cylindrical socket extending into said underside surface and adapted to engagingly receive said dolly boss.

4. An assembly according to claim 2 wherein said container rib having a bottom surface recessed a distance into said underside of the container.

5. A mobile refuse container assembly comprising:

a quadrilateral refuse container assembly having attachment means centrally disposed on an underside surface, and downwardly directed registration means disposed on said underside surface;

a quadrilateral dolly having centrally disposed connection means in a top surface for rotary screw threaded engagement with said container attachment means, and said dolly further having sidewalls adapted to assume a prescribed orientation with sidewalls of said container, wherein corresponding said sidewalls of the container and the dolly being in co-planar alignment in said prescribed orientation, said dolly further having upwardly directed alignment means for engaging said container registration means and terminating rotary movement between the container and the dolly when said sidewalls of the container and the dolly are in the prescribed orientation;

said container registration means and said dolly alignment means comprising complementary projection means and depression means adapted and positioned to mutually engage as the container and the dolly are relatively rotated into said co-alignment;

said depression means comprising a flange extending perpendicularly upward from said dolly top surface, and having an inclined top surface and a transverse groove extending downwardly into said inclined surface; and said projection means comprising a rib extending downwardly from said container bottom surface and positioned to enter said groove as said container and said dolly are relatively rotated into said co-alignment.

6. A mobile refuse container assembly comprising:

a quadrilateral refuse container having attachment means centrally disposed on an underside surface, and downwardly directed registration means disposed on said underside surface;

a quadrilateral dolly having centrally disposed connection means in a top surface for rotary screw threaded engagement with said container attachment means, and the dolly further having upwardly directed alignment means for engaging the said container registration means and terminating relative rotary movement between the container and the dolly when sidewalls of the dolly are co-aligned with sidewalls of the container;

said container registration means and said dolly alignment means comprising complementary projection means and depression means adapted and positioned to mutually engage as the container and the dolly are co-aligned, said projection means and said depression means being disengaged by rotating the dolly relative to the container in a reverse direction; and said depression means comprising a flange extending perpendicularly upward from said dolly top surface, and having an inclined top surface and a transverse groove extending downwardly into said inclined surface; and said projection means comprising a rib extending downwardly from said container bottom surface and positioned to enter said groove as said container and said dolly are relatively rotated.

* * * * *